(12) United States Patent
Miller

(10) Patent No.: US 10,338,319 B2
(45) Date of Patent: Jul. 2, 2019

(54) PHASE SHIFTING BY MECHANICAL MOVEMENT

(71) Applicant: The Board of Trustees of the Leland Stanford Junior University, Palo Alto, CA (US)

(72) Inventor: David A. B. Miller, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 0 days.

(21) Appl. No.: 15/380,062

(22) Filed: Dec. 15, 2016

(65) Prior Publication Data
US 2017/0235056 A1    Aug. 17, 2017

Related U.S. Application Data

(60) Provisional application No. 62/294,479, filed on Feb. 12, 2016.

(51) Int. Cl.
*G02B 6/293* (2006.01)
*H01P 1/18* (2006.01)
*H01P 5/04* (2006.01)
*H01P 3/16* (2006.01)
*H01P 5/18* (2006.01)

(52) U.S. Cl.
CPC ..... *G02B 6/29395* (2013.01); *G02B 6/29331* (2013.01); *H01P 1/182* (2013.01); *H01P 3/16* (2013.01); *H01P 5/04* (2013.01); *H01P 5/18* (2013.01)

(58) Field of Classification Search
CPC ... G02B 6/29395; G02B 6/29331; H01P 5/04; H01P 1/182
See application file for complete search history.

(56) References Cited

U.S. PATENT DOCUMENTS

| | | | |
|---|---|---|---|
| 3,146,413 A | 8/1964 | Butler | |
| 5,701,372 A | 12/1997 | Magel et al. | |
| 6,614,947 B1 | 9/2003 | Al-hemyari | |
| 6,909,824 B1 * | 6/2005 | Messica | G02B 6/12007 385/15 |

OTHER PUBLICATIONS

Han et al., "Large-scale silicon photonic switches with movable directional couplers", 2015, Optica v2n4, pp. 370-375.

* cited by examiner

*Primary Examiner* — John Bedtelyon
(74) *Attorney, Agent, or Firm* — Lumen Patent Firm

(57) ABSTRACT

A modified directional coupler structure is used to provide a controllable time delay or phase shift for radiation propagating through the structure. A longitudinal displacement of the interaction region of the directional coupler relative to one or both of the waveguides of the directional coupler provides this effect. Double flexure arrangements can be used to provide longitudinal displacement with substantially no corresponding lateral displacement (or vice versa). In some embodiments, lateral and longitudinal displacement of the waveguides of the directional coupler are independently adjustable to provide full control of the power splitting and phase shift/time delay of the directional coupler.

8 Claims, 11 Drawing Sheets

PHASE SHIFTING BY MECHANICAL MOVEMENT

CROSS REFERENCE TO RELATED APPLICATIONS

This application claims the benefit of U.S. provisional patent application 62/294,479, filed on Feb. 12, 2016, and hereby incorporated by reference in its entirety.

GOVERNMENT SPONSORSHIP

This invention was made with Government support under contract number FA9550-12-1-0024 awarded by the Air Force Office of Scientific Research. The Government has certain rights in the invention.

FIELD OF THE INVENTION

This invention relates to providing a phase or time delay in an optical path.

BACKGROUND

Many optical functions require the ability to change the phase or time delay in an optical path. Using such phase or time delays in interferometric structures allows modulation of the intensity of light beams, switching of light beams between different paths, and control of spectral filtering operations.

One common approach to changing the phase or time delay in an optical path is to change the refractive index of a material in the path. Unfortunately, many such methods can only make very small changes in refractive index, so relatively long paths through the materials are required and only small changes in phase or time delays can typically be created. Materials that offer large changes in refractive index often also have relatively large optical absorption under some of the desired operating conditions, restricting their usefulness. Large path length changes can be made by mechanically moving a reflector. One common method is to use a retroreflector on a translation stage. In such a case, the total optical path length in a beam that travels to the reflector and back again can be changed by moving the reflector. Unfortunately, it is difficult to make a version of such a device that can be conveniently integrated using waveguide paths without being able to stretch a waveguide material, and it is difficult in practice to stretch materials and waveguide structures, such as optical fibers, by large amounts.

SUMMARY

Here we describe an approach based on mechanical movement that allows large changes in optical path in waveguide structures without the need for substantial stretching. Instead, this approach substantially only requires bending of waveguides rather than stretching them to any substantial degree. This method is suitable for use in technologies such as silicon photonics, where waveguides made of silicon or other materials can be used conveniently to make waveguides and where known micromechanical techniques can be used to make the necessary mechanical displacements.

DETAILED DESCRIPTION

Figure 1A:
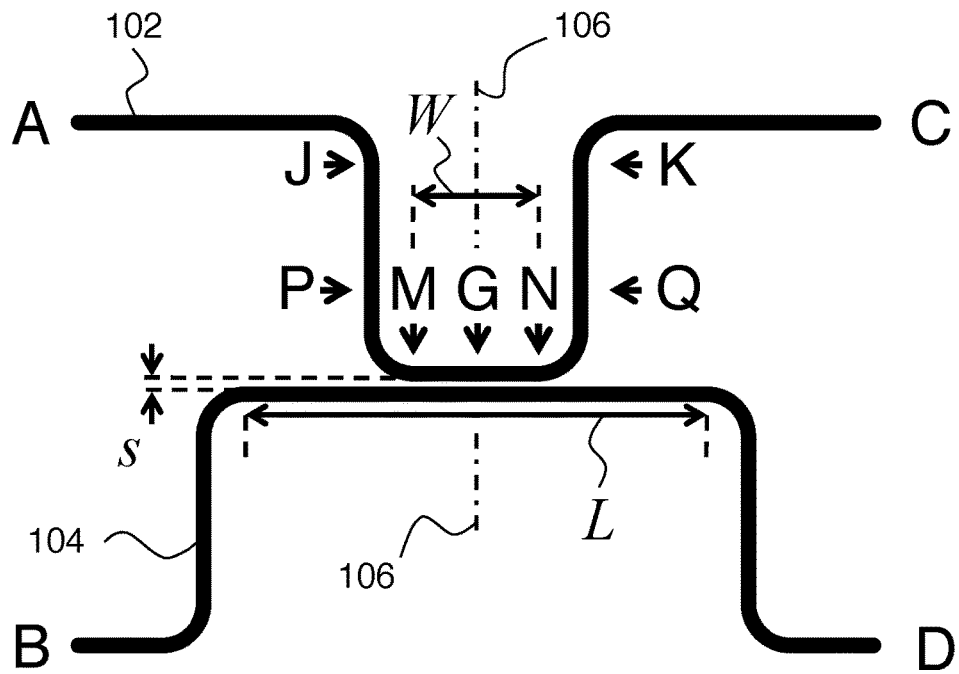
FIGS. 1A-B show principles relating to operation of embodiments of the invention.
Figure 1B:
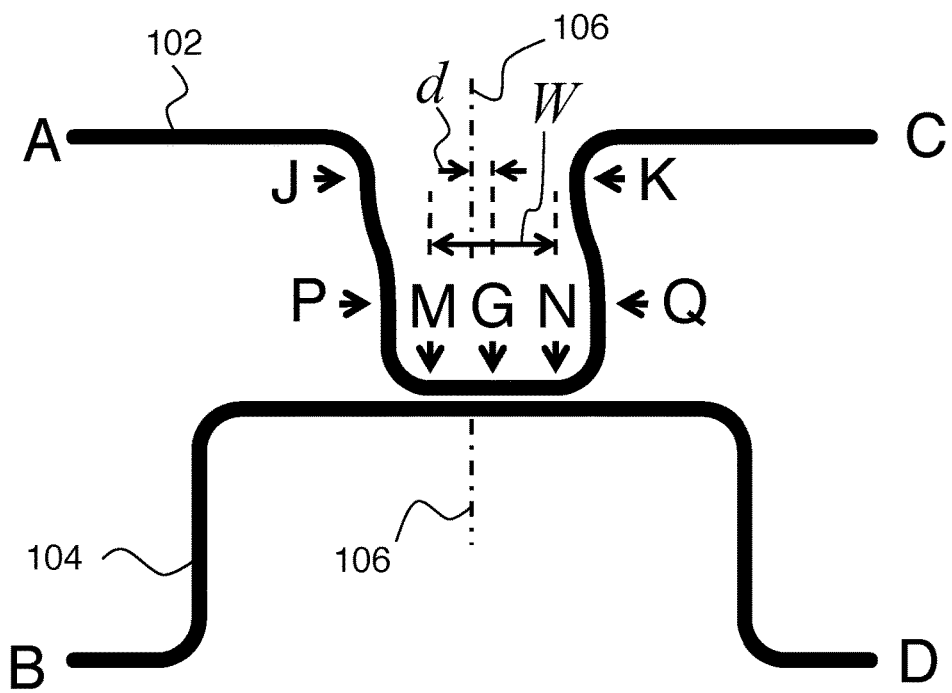

The core concept of the idea is illustrated in FIGS. 1A-B. The device is based on the idea of a directional coupler. In this example, there are two waveguides. A first waveguide 102 runs from point A to point C, and a second waveguide 104 runs from point B to point D. As is typical for a directional coupler, the two waveguides are brought close together over some characteristic interaction length W, which lies between points M and N. This length may correspond substantially with some length of substantially straight waveguide as part of the first waveguide path that runs from point A to point B. Points J and K are also marked in FIGS. 1A-B. These will be nominally fixed points on the first waveguide 102. Also shown is a substantially straight length L as part of the second waveguide path that runs from point C to point D.

Over the interaction length W, the two waveguides 102 and 104 are close to one another so that there is coupling between the waveguides, usually resulting from overlap of the evanescent field from each waveguide into the other waveguide. We can call this region of length W where the waveguides are close to one another the interaction region. By choice of the separation s of the two waveguides and the length W, this coupling between the waveguides can result in a controlled amount of the input power at point A in first waveguide 102 being coupled to appear as the output power at point D from second waveguide 104. Similarly a controlled amount of the input power at point B in second waveguide 104 can be coupled to appear as the output power at point C from first waveguide 102. The amount of this coupling can be controlled in a range substantially from no such power transfer from point A to point D to total power transfer from point A to point D and similarly for the power transfer from point B to point C. For a given length W, the amount of this coupling can be varied by varying the distance s.

In a typical directional coupler, the substantially straight lengths W and L are typically chosen to be equal. In this work, we make one of these lengths, here shown as L, substantially longer than the other. This choice of different lengths W and L makes no substantial difference to the basic operation of the directional coupler for a fixed position of the two waveguides, and the path lengths between A and C and between B and D can still be chosen to be substantially equal if desired. In the configuration as sketched in FIGS. 1A-B, these two path lengths are substantially equal.

FIG. 1A shows an initial position of the two waveguides. In operation of the device for controlling phase, the position of the interaction region W is displaced longitudinally. In the example as shown in FIG. 1B, first waveguide 102 is displaced longitudinally by an amount d, though longitudinal displacement of either or both waveguides can be used for the operation of the device. In the example of FIG. 1B this longitudinal displacement is created substantially by bending the two waveguide regions that lie between points J and P and between points K and Q, respectively.

For reference, a center line 106 centered around the middle of second waveguide 104 is shown on FIGS. 1A-B, and a point G is indicated that marks the center of the first waveguide. In FIG. 1B, a displacement d is marked, which is the amount by which the center point G of the first waveguide has been displaced longitudinally.

In the configuration of FIG. 1B, the optical path length from point A to point C and the optical path length from point B to point D both remain substantially unchanged compared to those of FIG. 1A. The optical path length from point A to point D has now been shortened, however, because the total length of waveguide that must be traversed in passing from point A to point D has been reduced by an amount d. If the waveguide can be characterized by an effective refractive index n, then the optical path length has been reduced by an amount nd, the propagation time of a light wave has been reduced by an amount nd/c, where c is the velocity of light in free space, and the phase delay has been reduced by an amount $2\pi nd/\lambda$ radians where $\lambda$ is the wavelength of the light in free space. Correspondingly, the optical path length from point B to point C has now been lengthened because the total length of waveguide that must be traversed in passing from point B to point C has been increased by an amount d. Hence, a device is provided that can change optical path length in waveguide structures by substantial amounts without requiring corresponding substantial stretching of the waveguides. Here we define optical radiation as electromagnetic radiation having a frequency in a range from 1 THz to 2000 THz.

This can be regarded as providing an adjustable longitudinal displacement d of the interaction region (W) with respect to one or both of the first and second waveguides without substantially changing the length W of the interaction region. Note that this cannot be done in a conventional directional coupler structure that has equal length waveguide sections disposed near each other, because longitudinal displacement of a waveguide in such a structure will necessarily change the interaction length.

In operation of such a device as a controllable phase shifter, it is preferable that the power transfer between the first waveguide and the second waveguide is substantially complete so that the device does not lose optical power on the desired path, which can be chosen to be the path from A to D. That is, for use as a phase shifter, it is desirable to set the device so that substantially all the power incident at point A on the first waveguide appears at the output D from the second waveguide. Such a condition can be arranged by the choice of the separation s in the interaction region of the structure, provided the interaction region is sufficiently long. (In such a situation with essentially complete coupling of the input power at A to the output at D in an otherwise substantially loss-less structure, substantially all the power incident at point B would be coupled to the output at C, allowing an alternative configuration of inputs and outputs for operation as a phase shifter.)

As shown with substantially straight waveguide regions between a fixed point J and a moveable point P and between a fixed point K and a moveable point Q, for small longitudinal displacements d there would be little change in the separation s between the two waveguides over the length W. To keep the amount of power coupled between the waveguides constant, it is often desirable to make only very small changes in the separation s in operation as the interaction region is displaced longitudinally because changes in the size of that separation s will change the amount of power coupling. In the following description, it will be convenient to refer to a mechanical displacement tending to change d but not s as a longitudinal displacement. A mechanical displacement tending to change s but not d is referred to as a lateral displacement.

Figure 2A:
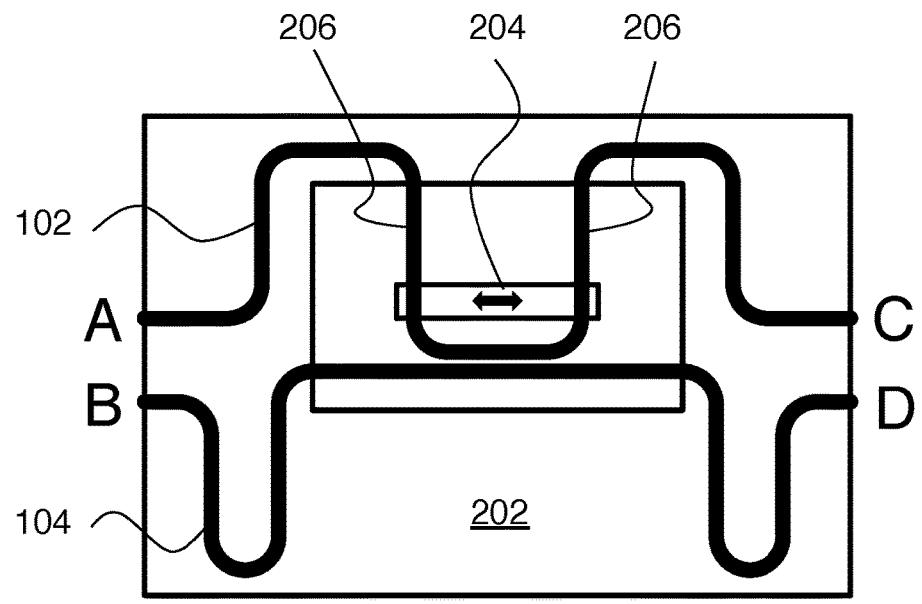
FIGS. 2A-B show a first embodiment of the invention.
Figure 2B:
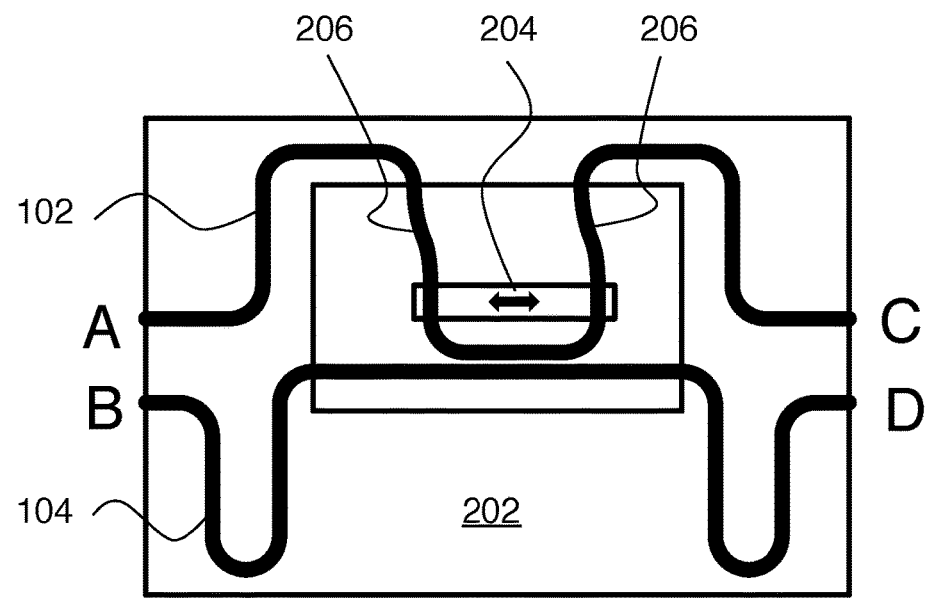

FIGS. 2A-B show a configuration in which there would be relatively little change in the separation s as a region of the first waveguide is moved. Now explicitly we show substrate 202 (fixed) and member 204 (movable) in the figure. In technologies such as silicon photonics and other integrated photonics technologies, waveguides are typically fabricated on a substantially rigid substrate to which they remain attached unless they are specifically detached from the substrate or the substrate underneath them is removed. The substrate can be etched away in specific regions. In FIGS. 2A-B, the substrate is shown etched away in part of a central rectangular region. The remaining outer substrate region 202 is a fixed substrate. Part of the original substrate, shown as member 204, remains in the central rectangular region. Here we use member as a generic term to refer to structures that are movable with respect to the fixed substrate.

In such a structure as in FIGS. 2A-B, it is optional whether additional substrate material remains in or around the regions underneath those waveguide regions not lying directly over the fixed substrate 202 or member 204, which we can refer to as free waveguide regions and which are also referenced as flexures 206 in FIGS. 2A-B. For clarity and simplicity, no substrate is explicitly drawn or indicated underneath such free waveguide regions. The inclusion or otherwise of such substrate material under such free waveguide regions will affect mechanical properties such as stiffness, and the choice and control of such stiffness would form part of the detailed mechanical design of such a structure. Member 204 is connected to the fixed substrate 202 only through the flexures 206, and is otherwise free to move relative to the fixed substrate 202.

FIG. 2A shows the device in a starting condition. FIG. 2B shows the device after member 204 is displaced substantially to the right in the figure so as to cause the desired changes in optical path as described above in connection with FIGS. 1A-B. In such operation, regions of the waveguide (and of the substrate material beneath these regions, if present) are operating mechanically as flexures, as indicated in FIGS. 2A-B. In such a configuration, there is relatively little change in the waveguide separation s as member 204 is moved left and right by moderate amounts. Note that for this configuration to operate effectively, it is important that the starting position, as shown in FIG. 2A is such that the waveguides that will operate as flexures 206 are all substantially perpendicular to the motion of member 204, are parallel and are of substantially the same length. Not shown in FIGS. 2A-B is additional means to cause the longitudinal displacement of member 204 relative to the fixed substrate 202. Such means could include an electrostatic comb drive, with one set of comb teeth on member 204 and a corresponding complementary set of interleaving comb teeth on the fixed substrate 202, with the electrostatic attraction between the sets of comb teeth controlled by an applied voltage between substrate 202 and member 204. Alternatively such means could include other electrical, magnetic, or electromagnetic means.

Figure 3A:
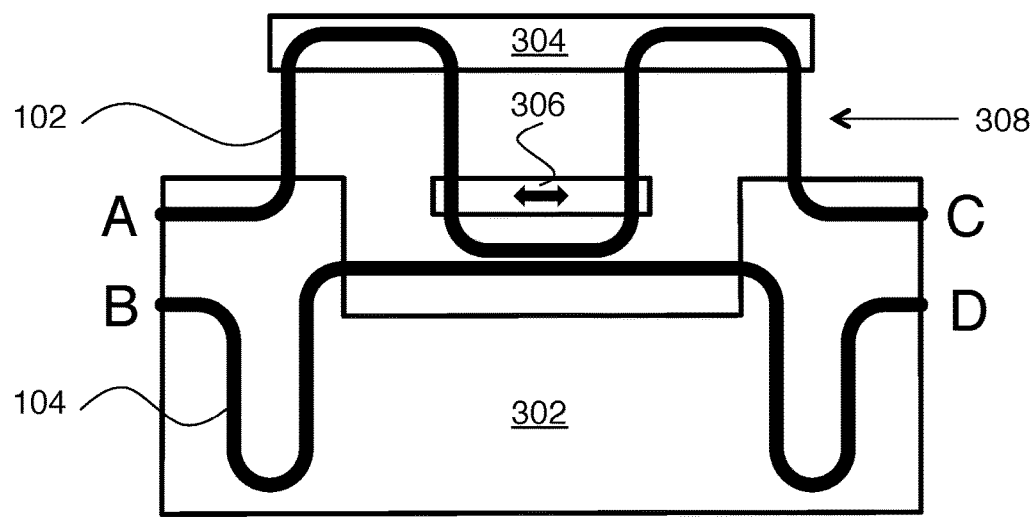
FIGS. 3A-B show a second embodiment of the invention.
Figure 3B:
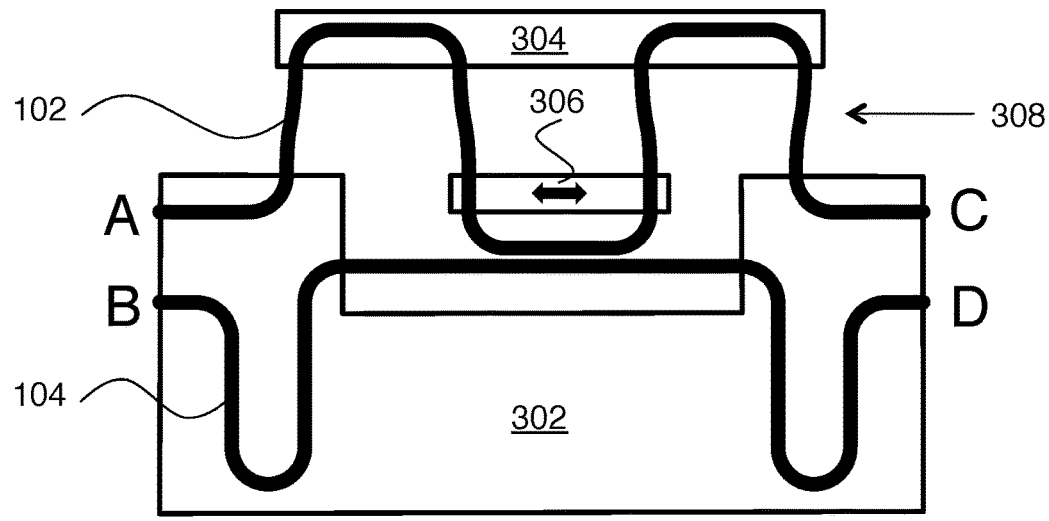

In the configuration of FIGS. 2A-B, the waveguide separation s will change slightly as member 204 is moved from left to right. This may be tolerable in device operation, but an improved mechanical arrangement, in which any such change is waveguide separation is substantially eliminated, is shown in FIGS. 3A-B. In the configuration of FIGS. 3A-B, a second free member, member 304 is created, for example in the same kind of selective substrate removal process as for the structure of FIGS. 2A-B. Here 302 is a fixed substrate and 306 is a free member for providing longitudinal displacement as described above. Now four waveguide sections 308 function as flexures. In this configuration, when the waveguide flexures 308 bend, member 304 moves not only longitudinally, but also laterally (at least to a relatively small degree), with the lateral movement being such as to leave the lateral position of member 304 substantially unchanged as member 304 is moved longitudinally. Such behavior is generally well understood in such doubled flexure configurations by those skilled in the art. Note that for this configuration to operate effectively, it is important that the starting position, as shown in FIG. 3A, is such that the waveguides that will operate as flexures are all substantially perpendicular to the motion of member 304 and parallel to each other.

In the configurations discussed so far, the initial waveguide separation s is presumed to be fixed as a result of the initial fabrication of the structure. In the operation of directional coupler structures in general, it can be difficult to fabricate the dimension s with sufficient precision. Furthermore, it may be desirable in operation to change the amount of coupling between the waveguide regions. Control of such separation s allows control of the amount of power coupled between the first and second waveguides in the device, offering additional useful functionality for the device. Hence it is useful also to be able to adjust the separation s.

Figure 4A:
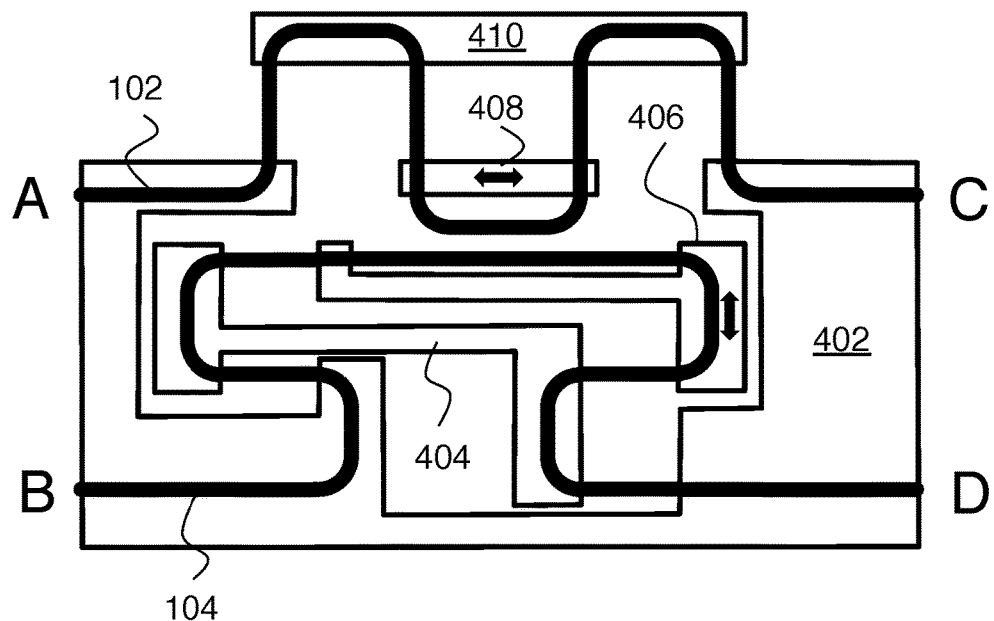
FIGS. 4A-C show a third embodiment of the invention.
Figure 4B:
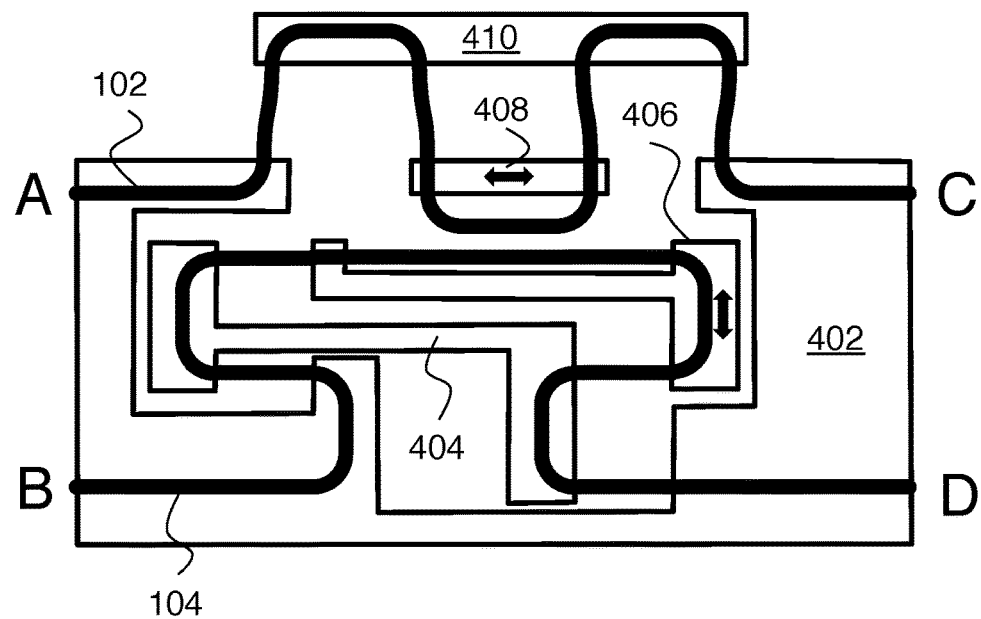
Figure 4C:
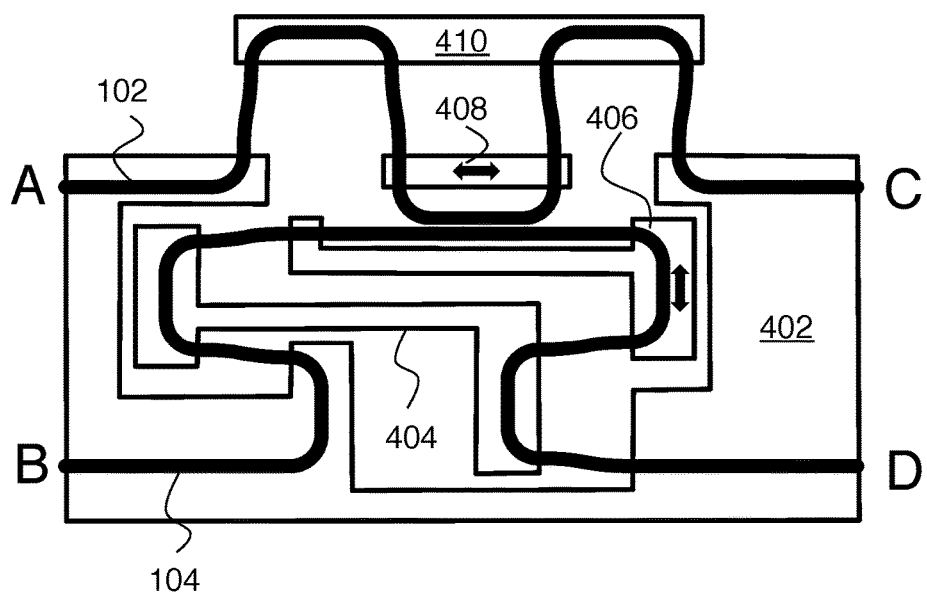

FIGS. 4A-C show one configuration in which a mechanism for adjusting the separation s of the waveguides has been incorporated. In this configuration, 402 is the fixed substrate and 404, 406, 408, and 410 are all free members. Free members are connected to the fixed substrate via double flexure arrangements as described above. In this case, the arrangement allows member 406 to be adjusted laterally without any substantial longitudinal movement. Not shown in the figure is additional means to cause the lateral displacement of member 406. Such means could include electrostatic comb drives or other electrical, magnetic, or electromagnetic means. FIG. 4A shows the starting position of the structure. FIG. 4B shows the state of the structure after a longitudinal movement of member 408. Between FIG. 4A and FIG. 4B, there is substantially no change in the separation s between the waveguides. FIG. 4C shows the state of the structure after a lateral movement of member 406. Such a lateral movement results in substantially no longitudinal movement of member 406 because of the properties of the double flexure arrangement. In this structure it is important that the four waveguide flexures in the lower part of the figure are all substantially perpendicular to the motion of member 406, parallel and are of substantially the same length, as shown in the figure. In operation of this lateral movement, member 404 will move laterally and will also move longitudinally by a small amount, but member 406 will substantially only move laterally.

Figure 5A:
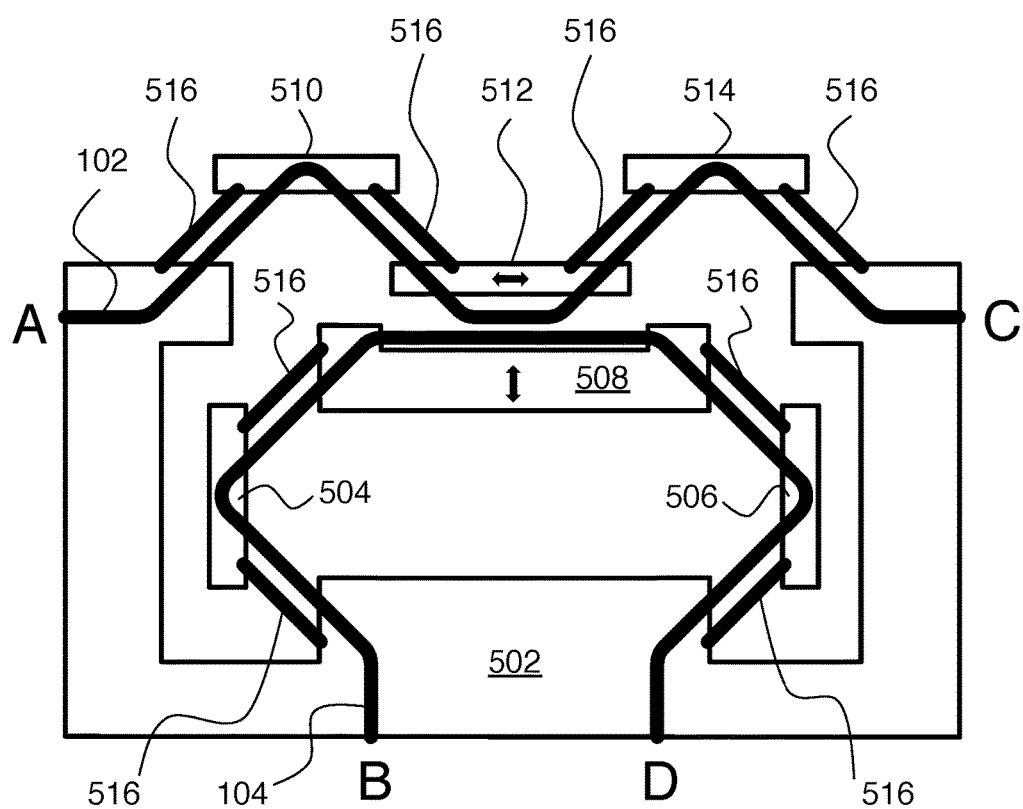
FIGS. 5A-C show a fourth embodiment of the invention.
Figure 5B:
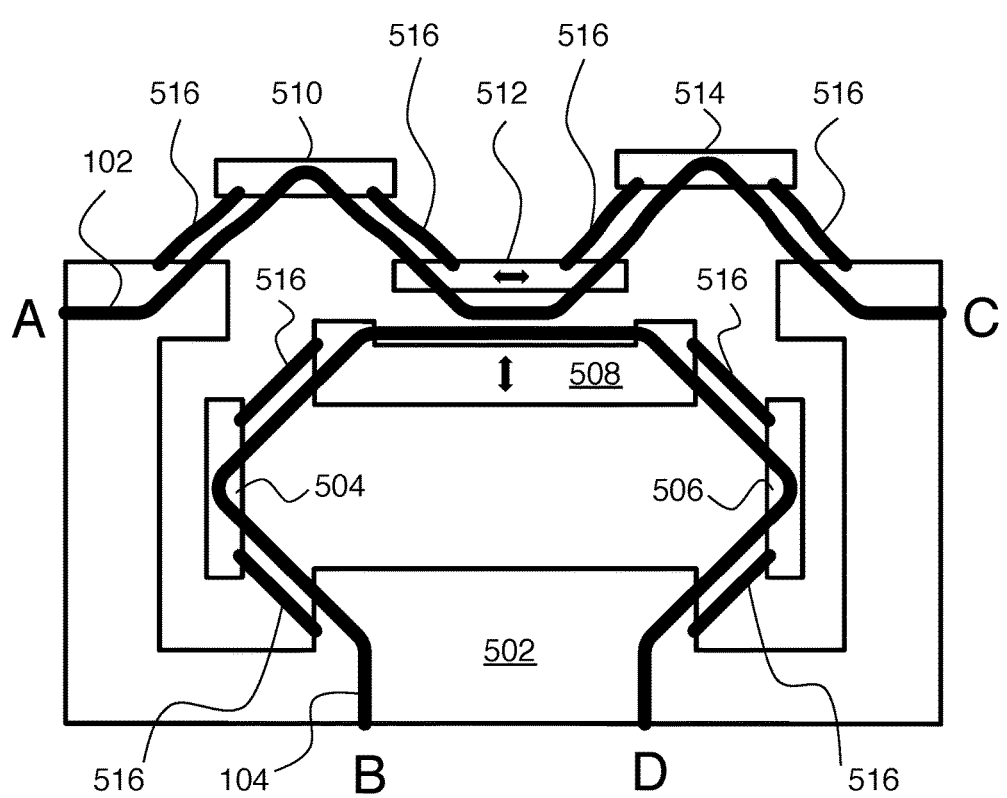
Figure 5C:
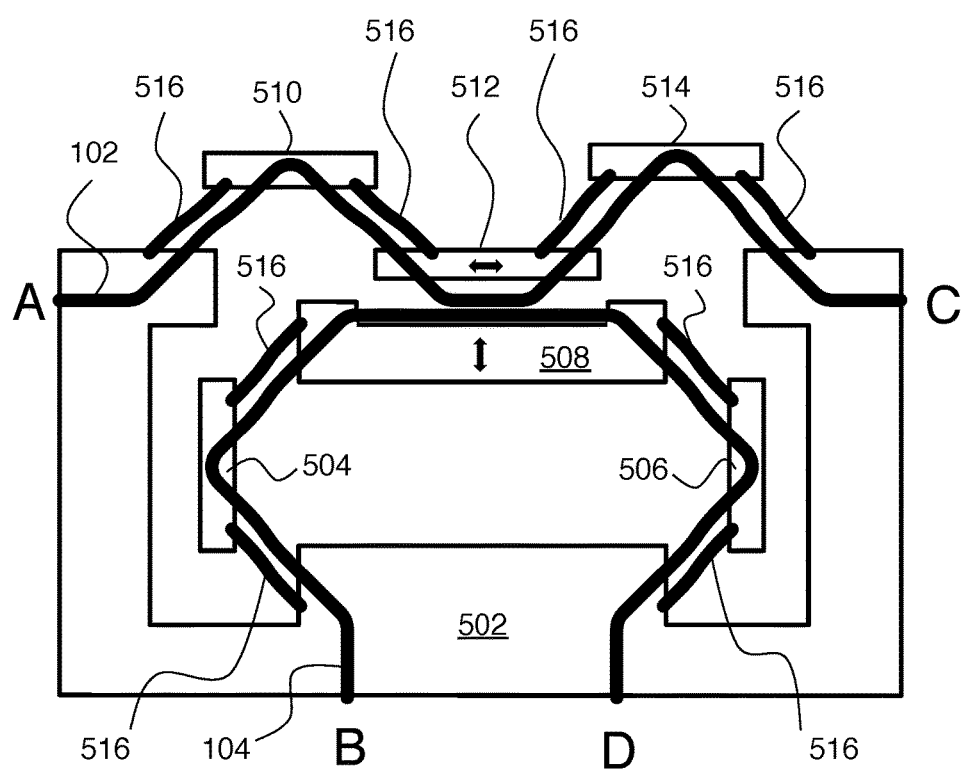

Alternative arrangements for adjusting the longitudinal position of member 512 and the lateral position of member 508 are shown in FIGS. 5A-C. Here 502 is the fixed substrate, 508 and 512 are the main free members for controlling device operation, and free members 504, 506, 510 and 514 are part of the mechanical flexure structure of this example. FIG. 5A shows the starting configuration. FIG. 5B shows the device with member 512 displaced longitudinally to adjust a phase or time delay. FIG. 5C shows the device with member 508 also displaced laterally to adjust a coupling strength.

In the arrangements of FIGS. 5A-C, additional auxiliary flexures 516 are shown. Such auxiliary flexures are preferentially fabricated in a substantially identical manner to the other waveguide flexures in the structure, but these auxiliary flexures are not required to perform any optical function even though they may be fabricated with waveguide structures so as to have identical mechanical behavior to that of the optically connected flexures. The use of such auxiliary flexures allows the waveguide structures to be fabricated without the necessity of 90 degree bends. Note that the waveguide bends in the structures of previous figures are all shown as being substantially 90 degree bends in the starting configuration. Generally bends in waveguide structures can lead to loss and other undesired optical behaviors such as coupling to other modes or polarizations, and so it is desirable to be able to minimize the amount of bending in waveguides. The waveguide bends shown in FIGS. 5A-C are shown as being of approximately 45 degrees, though this approximately 45 degree angle is only illustrative. The basic mechanical operation of the flexure arrangements in FIG. 5 can work for other angles, including smaller or larger angles of waveguide bends. It is important that each adjacent pair of flexures (that is, a waveguide flexure and an adjacent auxiliary flexure) should be substantially parallel in the starting state and of substantially the same length between the two structures they connect, and it is preferable that the arrangement of flexures and members associated with the movement of member 512 be symmetrical about the longitudinal center of member 512, and that the arrangement of flexures connected to members 510 and 514 be symmetrical about the longitudinal centers of those members in their starting state. It is also preferable that the arrangement of flexures and members associated with the movement of member 508 be symmetrical about the longitudinal center of member 508 in its starting state and that the arrangement of flexures connected to members 504 and 506 be symmetrical about the lateral centers of those members in their starting state.

In the operation of the arrangement as shown in FIGS. 5A-C, member 512 can be moved longitudinally with substantially no lateral movement. As it is moved longitudinally, for example, to the right, members 510 and 514 will move longitudinally also to the right, but member 510 will move down laterally whereas member 512 will move up laterally. Similarly, member 508 can be moved laterally with substantially no longitudinal movement. As it is moved laterally, for example, upwards, members 504 and 506 will move upwards, but member 504 will move to the right whereas member 506 will move to the left. Not shown in FIGS. 5A-C are means for displacing member 512 longitudinally and member 508 laterally. Such means could include electrostatic comb drives or other electrical, magnetic, or electromagnetic means.

Figure 6A:
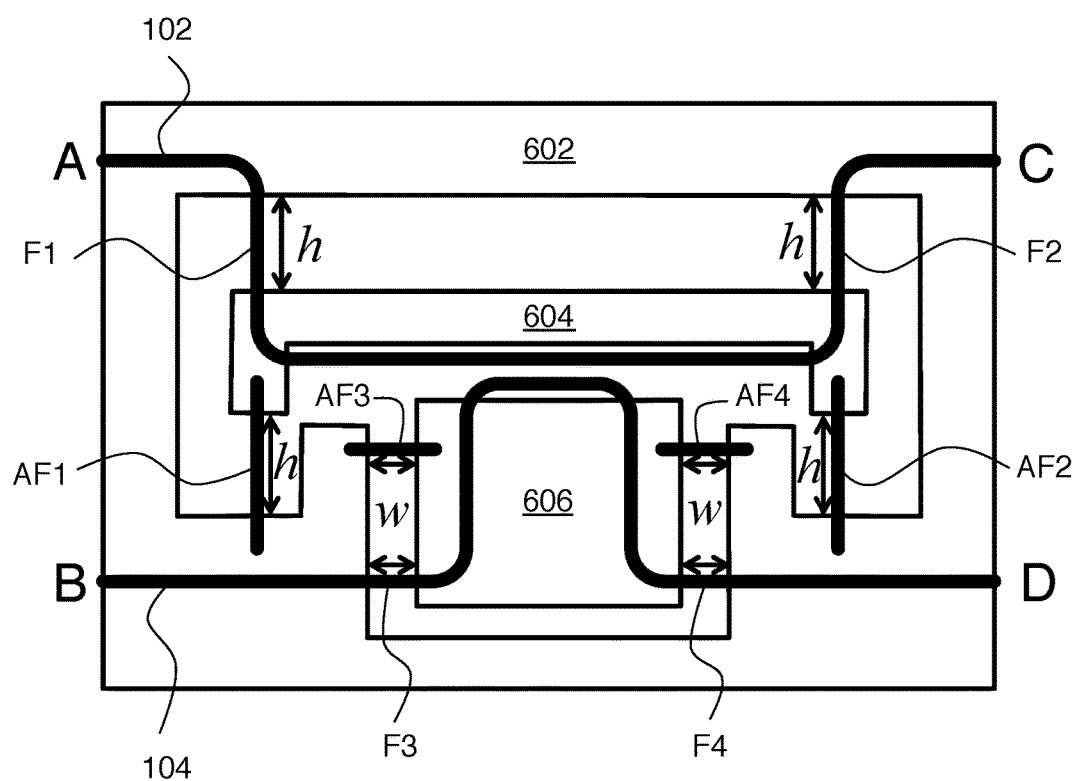
FIGS. 6A-C show a fifth embodiment of the invention.
Figure 6B:
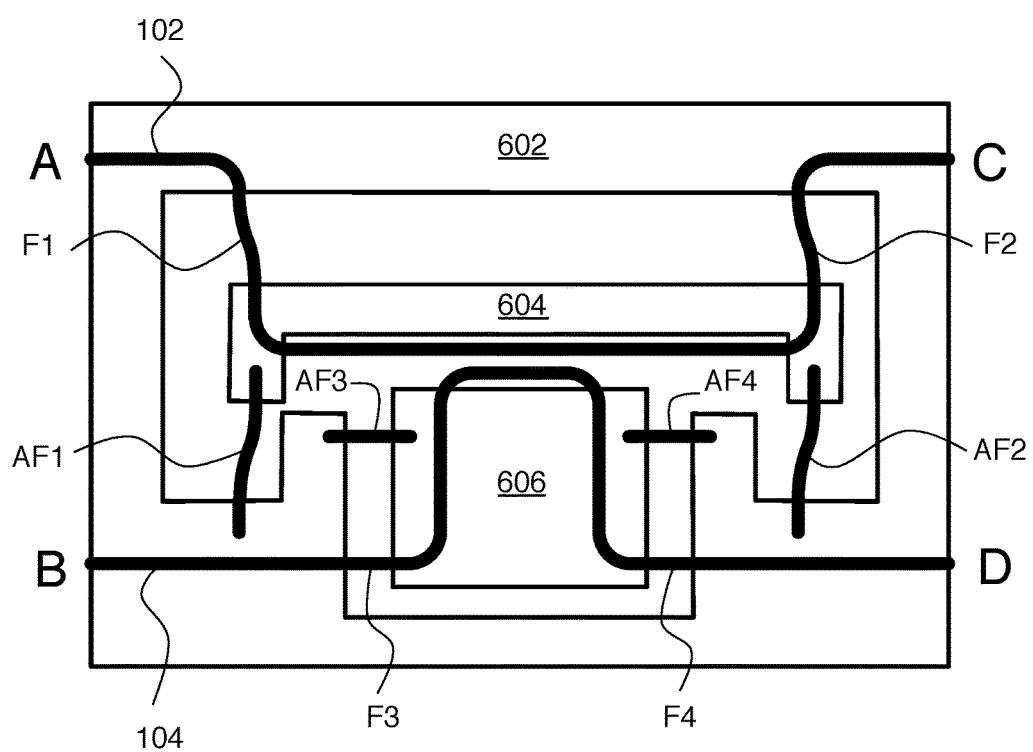
Figure 6C:
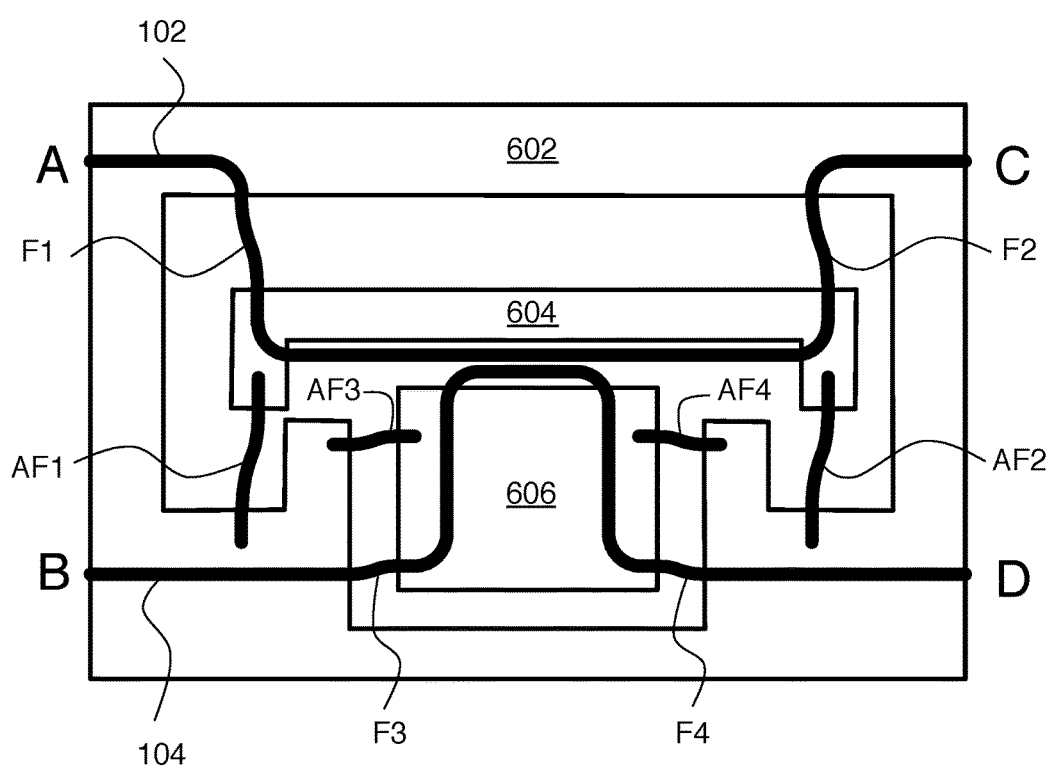

A further embodiment is shown in FIGS. 6A-C. Here 602 is the fixed substrate, and 604 and 606 are the free members for controlling device operation. FIG. 6A shows the starting configuration. FIG. 6B shows the device with member 604 displaced longitudinally to adjust a phase or time delay. FIG. 6C shows the device with member 606 also displaced laterally to adjust a coupling strength.

This approach also includes waveguides functioning as flexures and auxiliary flexures. F1, F2, F3 and F4 are waveguide flexures, and AF1, AF2, AF3 and AF4 are auxiliary flexures that are preferably fabricated in a similar manner to the waveguide flexures. F1, F2, AF1 and AF2 are all fabricated so that the length that is free to flex is substantially the same, at a length h. F3, F4, AF3 and AF4 are all fabricated so that the length that is free to flex is substantially the same, at a length w. Not shown in FIGS. 6A-B are means for displacing member 604 longitudinally and member 606 laterally. Such means could include electrostatic comb drives or other electrical, magnetic, or electromagnetic means.

In the embodiment of FIGS. 6A-C, member 604 can be moved substantially longitudinally, with substantially no lateral movement, and member 606 can be moved substantially laterally with substantially no longitudinal movement. The approach of FIGS. 6A-C has flexures in opposing pairs, that is, the pairs F1 and AF1, F2 and AF2, F3 and AF3, and F4 and AF4. In operation, these flexures will be stretched slightly as member 606 and member 604 are displaced from their starting position, which allows that stretching to be used as an additional spring mechanism if desired. Furthermore, the use of these opposing flexure pairs means that, if desired, these flexures can be fabricated to be under tension, allowing control of the restoring force of these spring elements beyond the spring action from just the natural bending stiffness of the flexures, and hence allowing additional options in device design. Though in the examples of FIGS. 4A-C, 5A-C and 6A-C we have discussed here first a longitudinal movement in the upper part of the structure and then a lateral movement in the lower part of the structure, these motions are independent and can be performed in any desired order and as often as required as appropriate in the operation of the device.

Note that the ability to control both the separation s and the longitudinal displacement d in such structures as in FIGS. 4A-C, 5A-C and 6A-C allows the device to function not only as a phase shifter but also as a controllable coupler. So, for an input power at some specific wavelength in port A, we can choose the relative amplitude and relative phase with which such power is split between the two outputs C and D. At the same time, we will also be controlling the relative amplitude and relative phase with which any input power in port B is split between the two outputs C and D. Indeed, other than for an overall additional fixed phase shift between inputs and outputs, such structures, to the extent they are substantially loss-less, can implement any unitary linear mapping between the input vector of the two amplitudes at ports A and B and the output vector of two amplitudes at ports C and D, where such a linear mapping can be represented by a unitary two-by-two matrix. Such a controllable component has many uses in optical networks and filters.

The invention claimed is:

1. Apparatus for providing a phase shift for one or more propagating waves, the apparatus comprising:
    a first waveguide configured to support one or more first propagating waves;
    a second waveguide configured to support one or more second propagating waves;
    wherein the first waveguide and the second waveguide are in lateral proximity to each other in an interaction region such that the first and second propagating waves propagating in the first and second waveguides are coupled in the interaction region;
    a mechanism configured to provide an adjustable longitudinal displacement d of the interaction region with respect to one or both of the first and second waveguides without substantially changing a length W of the interaction region;
    further comprising a substrate wherein the first waveguide is affixed to a first member attached to the substrate via one or more first flexures;
wherein the one or more first flexures comprise a double flexure arrangement configured to adjust the longitudinal displacement d without making a corresponding change in a lateral separation s between the first waveguide and the second waveguide in the interaction region;
    wherein the double flexure arrangement includes two flexible waveguide sections disposed parallel to each other.

2. The apparatus of claim 1,
    wherein the double flexure arrangement further includes two flexible members disposed parallel to each other and parallel to the two flexible waveguide sections.

3. Apparatus for providing a phase shift for one or more propagating waves, the apparatus comprising:
    a first waveguide;
    a second waveguide;
    wherein the first waveguide and the second waveguide are in lateral proximity to each other in an interaction region such that waves propagating in the first and second waveguides are coupled in the interaction region;
    a mechanism configured to provide an adjustable longitudinal displacement d of the interaction region with respect to one or both of the first and second waveguides without substantially changing a length W of the interaction region
    further comprising a substrate, wherein the first waveguide is affixed to a first member attached to the substrate via one or more first flexures;
    wherein the second waveguide is affixed to a second member attached to the substrate via one or more second flexures.

4. The apparatus of claim 3, wherein the second waveguide is part of at least one of the one or more second flexures.

5. The apparatus of claim 3,
    wherein the one or more first flexures comprise a double flexure arrangement configured to adjust the longitudinal displacement d without making a corresponding change in a lateral separation s between the first waveguide and the second waveguide in the interaction region;
    wherein the one or more second flexures comprise a double flexure arrangement configured to adjust the lateral separation s without making a corresponding change in the longitudinal displacement d.

6. The apparatus of claim 5, wherein the one or more first flexures are configured as opposing pairs of flexures in tension.

7. The apparatus of claim 3, wherein the one or more second flexures are configured as opposing pairs of flexures in tension.

8. The apparatus of claim 3, wherein the propagating waves are electromagnetic waves having a frequency in a range from 1 THz to 2000 THz.

* * * * *